(12) United States Patent
Wang et al.

(10) Patent No.: US 8,743,056 B2
(45) Date of Patent: Jun. 3, 2014

(54) WATERPROOF COMPUTER MOUSE

(75) Inventors: Chin-Wen Wang, New Taipei (TW); Jung-Sheng Chi, New Taipei (TW)

(73) Assignees: Lite-On Electronics (Guangzhou) Limited, Guangzhou (CN); Lite-On Technology Corporation, Taipei (TW)

(*) Notice: Subject to any disclaimer, the term of this patent is extended or adjusted under 35 U.S.C. 154(b) by 125 days.

(21) Appl. No.: 13/243,660

(22) Filed: Sep. 23, 2011

(65) Prior Publication Data
US 2012/0293414 A1 Nov. 22, 2012

(30) Foreign Application Priority Data
May 18, 2011 (CN) .................... 2011 2 0157986 U

(51) Int. Cl.
*G06F 3/033* (2013.01)

(52) U.S. Cl.
USPC ............................ 345/163; 345/156; 345/157

(58) Field of Classification Search
USPC ......................................................... 345/163
See application file for complete search history.

(56) References Cited

U.S. PATENT DOCUMENTS

| | | | |
|---|---|---|---|
| 5,270,692 A * | 12/1993 | Rockwell ...................... | 345/163 |
| 6,340,966 B1 * | 1/2002 | Wang et al. ................... | 345/163 |
| 6,522,321 B1 * | 2/2003 | Chen et al. ..................... | 345/163 |
| 7,333,091 B2 * | 2/2008 | Hou et al. ...................... | 345/163 |
| 2006/0044270 A1 * | 3/2006 | Chen ............................. | 345/163 |
| 2008/0231598 A1 * | 9/2008 | Purcocks ...................... | 345/163 |
| 2011/0141017 A1 * | 6/2011 | Ku ................................ | 345/163 |

FOREIGN PATENT DOCUMENTS

TW            M376825            3/2010

* cited by examiner

*Primary Examiner* — Quan-Zhen Wang
*Assistant Examiner* — Chun-Nan Lin
(74) *Attorney, Agent, or Firm* — Li&Cai Intellectual Property (USA) Office

(57) ABSTRACT

A waterproof computer mouse includes an upper housing, a lower housing, a first waterproof ring, a second waterproof ring, a roller and a circuit board. The upper housing has an upper tubular portion downwardly extended therefrom in a through manner. The lower housing has a lower tubular portion upwardly extended therefrom through a bottom surface thereof. The upper tubular portion connects with the lower tubular portion to form a roller compartment therein. The first waterproof ring is disposed between a bottom edge of the upper housing and a top edge of the lower housing. The second waterproof ring is disposed between a bottom edge of the upper tubular portion and a top edge of the lower tubular portion. The roller is disposed in a rotatable manner in the roller compartment formed by the upper tubular portion and the lower tubular portion. The circuit board is disposed on the lower housing.

10 Claims, 7 Drawing Sheets

WATERPROOF COMPUTER MOUSE

BACKGROUND OF THE INVENTION

1. Field of the Invention

The present invention relates to a computer mouse, in particular, to a waterproof computer mouse input device that could prevent liquid from entering the interior of mouse.

2. Description of Related Art

In the past, keyboard and computer mouse were widely and popularly used as input device for computer. The computer mouse could quickly move a pointer on a graphical display and input by clicking, so that it has become an essential periphery product of computer.

Computer mouse is usually used on a flat working surface, such as a desk top. When user accidentally splashed water on computer mouse, water will easily enter the interior of the mouse from a slit around the roller and/or from assembly gaps of mouse's housing, which often causes damage to the electronic components therein.

Concerning water-proofing design for computer mice, one related art is Taiwan patent No. M376825, which is also filed as US patent application publication No. US20110141017 "Waterproof mouse". This waterproof mouse only provides a housing having water-proofing function and a touch panel instead of roller. However, the capacitive touch panel still has to consider the problem of waterproof. Further, the capacitive touch panel will increase the total cost and users need to change the operating habit.

Moreover, the pushing portion of the above conventional computer mouse has a protruded post passing through the covering housing, and then entering into the interior to touch the micro switches. It cannot completely block liquid outside the coving housing, especially the area approximated the protruded post. In other words, the waterproof structure around the pushing portion still has some shortage to improve.

SUMMARY OF THE INVENTION

In view of the aforementioned issues, the present invention provides a waterproof computer mouse, especially to a computer mouse has a roller and a complete waterproofing structure for the opening around the roller, so that liquid can be prevented entering the computer mouse from the housing or the opening around the roller.

Further, the computer mouse also has waterproof design around the pushing portions at two sides thereof, so that the pushing portions can prevent liquid from entering the computer mouse.

To achieve the above-mentioned objectives, the present invention provides a waterproof computer mouse including an upper housing, a lower housing, a first waterproof ring, a second waterproof ring, a roller and a circuit board. The upper housing has an upper tubular portion downwardly extended therefrom in a through manner. The lower housing has a lower tubular portion upwardly extended therefrom through a bottom surface thereof. The upper tubular portion connects with the lower tubular portion to form a roller compartment therein. The first waterproof ring is disposed between a bottom edge of the upper housing and a top edge of the lower housing. The second waterproof ring is disposed between a bottom edge of the upper tubular portion and a top edge of the lower tubular portion. The roller is disposed in a rotatable manner in the roller compartment formed by the upper tubular portion and the lower tubular portion. The circuit board is disposed on the lower housing.

To achieve the other aforesaid objects of the instant disclosure, the upper housing has a top member. The top member has a pair of through holes and a pair of covering pads covered on the pair of through holes. The circuit board has a pair of micro switches disposed under the pair of covering pads correspondingly.

The instant disclosure has at least advantage as follows. The upper housing and the lower housing have waterproof function by the first waterproof ring. The upper tubular portion and the lower tubular portion constitute a space for the roller rolling therein. There is also a waterproof design between the upper tubular portion and the lower tubular portion. A well sealed waterproof structure is formed around the roller, liquid will exhausted from a roller compartment through the upper tubular portion and the lower tubular portion. Besides, two pushing portions of the computer mouse also have waterproof structure.

In order to further understand the techniques, means and effects the present invention takes for achieving the prescribed objectives, the following detailed descriptions and appended drawings are hereby referred, such that, through which, the purposes, features and aspects of the present invention can be thoroughly and concretely appreciated; however, the appended drawings are merely provided for reference and illustration, without any intention to be used for limiting the present invention.

DETAILED DESCRIPTION OF THE PREFERRED EMBODIMENTS

Figure 1:
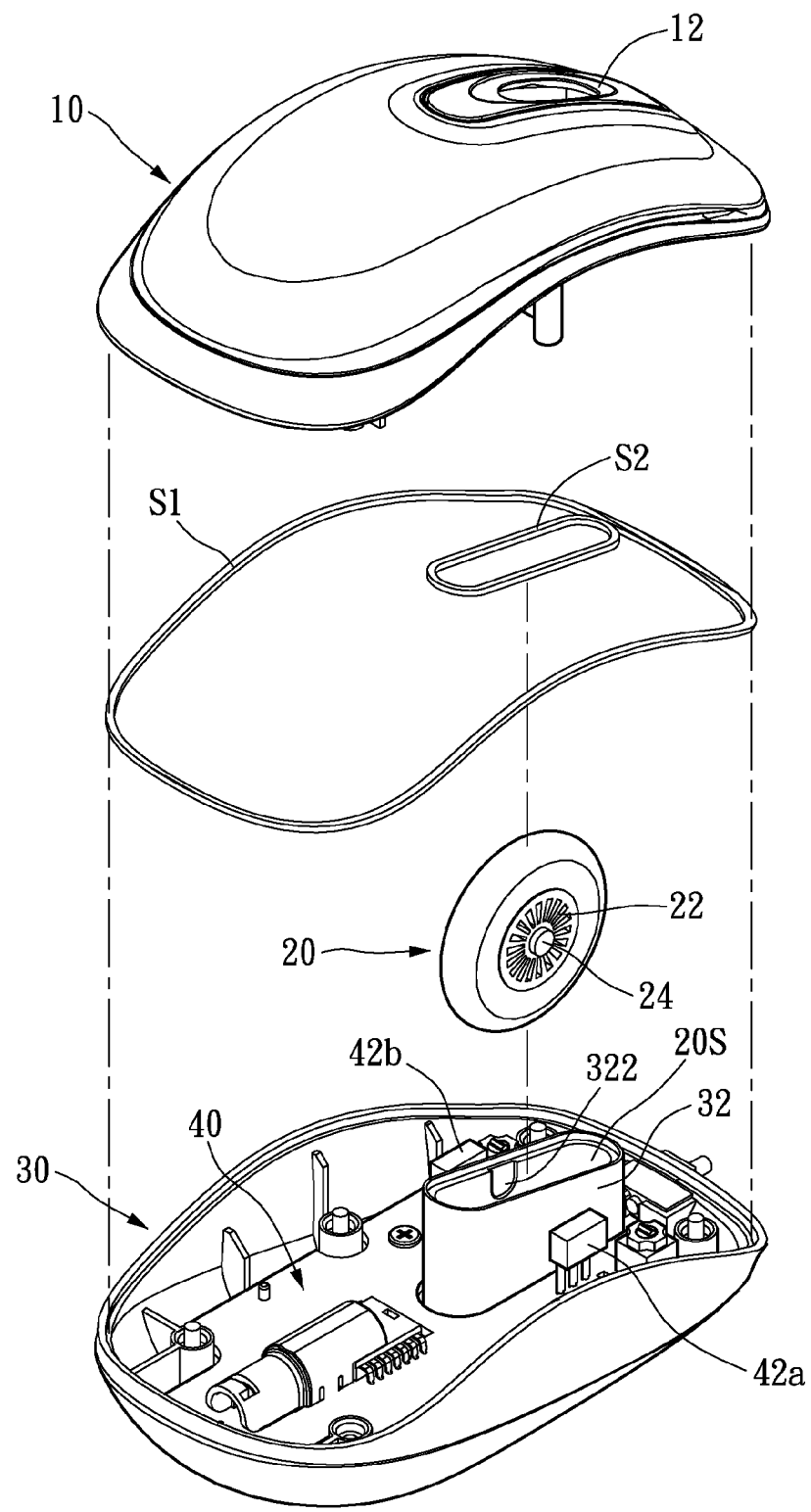
FIG. 1 is a perspective exploded view of a waterproof computer mouse according to the instant disclosure.
Figure 2:
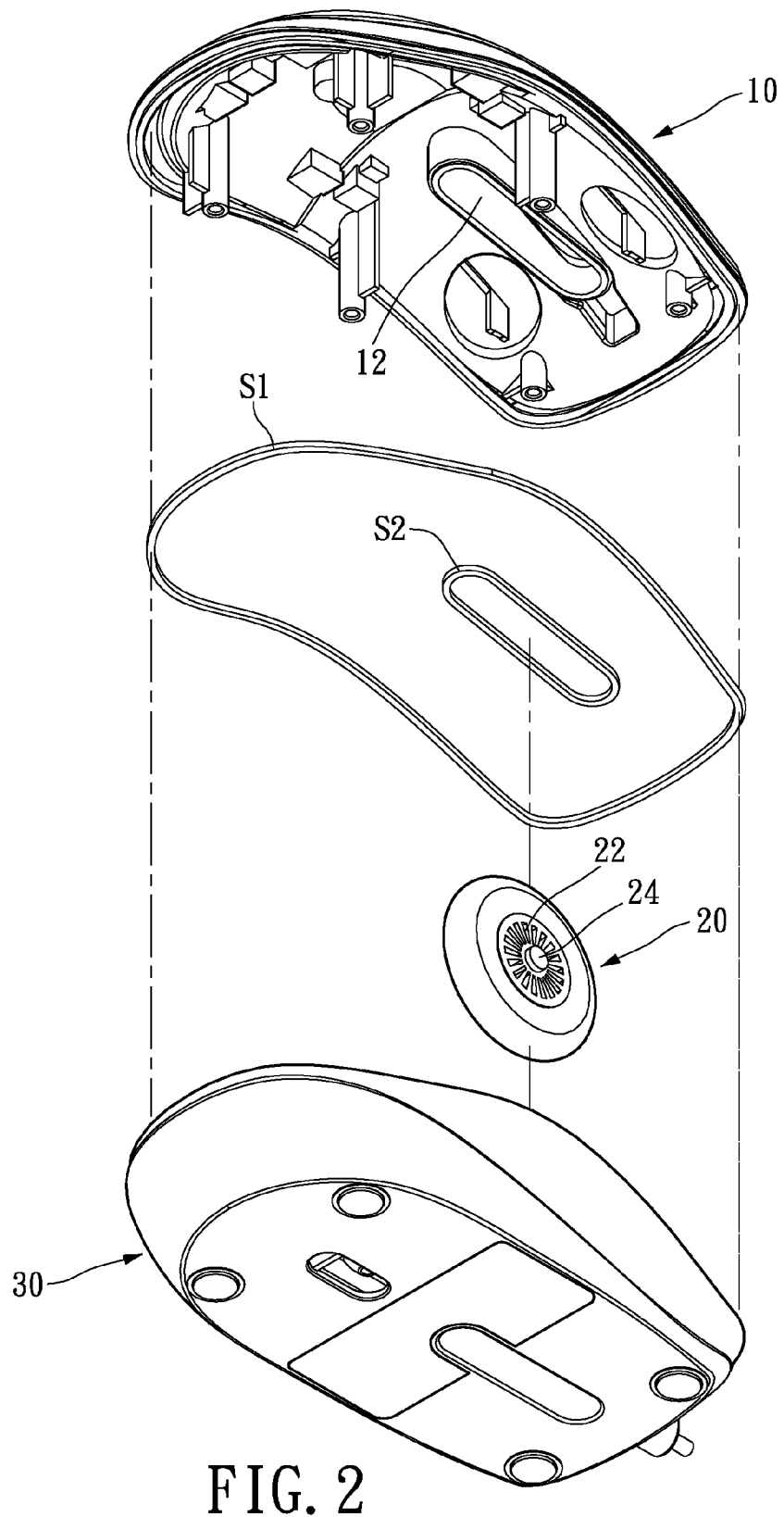
FIG. 2 is an other perspective exploded view of the waterproof computer mouse according to the instant disclosure.

Referring now to FIGS. 1 and 2, the instant disclosure provides a waterproof computer mouse having an upper housing 10, a roller 20, a lower housing 30 and a circuit board 40. The upper housing 10 has an upper tubular portion 12 downwardly extended therefrom in a through manner (shown as FIG. 2). The lower housing 30 has a lower tubular portion 32 upwardly extended therefrom through a bottom surface thereof. The upper tubular portion 12 is connected with the lower tubular portion 32 to form a roller compartment 20S therein. A waterproof ring S1 is disposed between a bottom edge of the upper housing 10 and a top edge of the lower housing 30, and another waterproof ring S2 is disposed between a bottom edge of the upper tubular portion 12 and a top edge of the lower tubular portion 32. The waterproof ring S1 could be named as first waterproof ring, and the waterproof ring S2 could be named as second waterproof ring. The roller 20 is disposed in a rotatable manner in the roller compartment 20S formed by the upper tubular portion 12 and the lower tubular portion 32. The circuit board 40 is disposed on the lower housing 30. The details will be introduced as follows.

Figure 3:
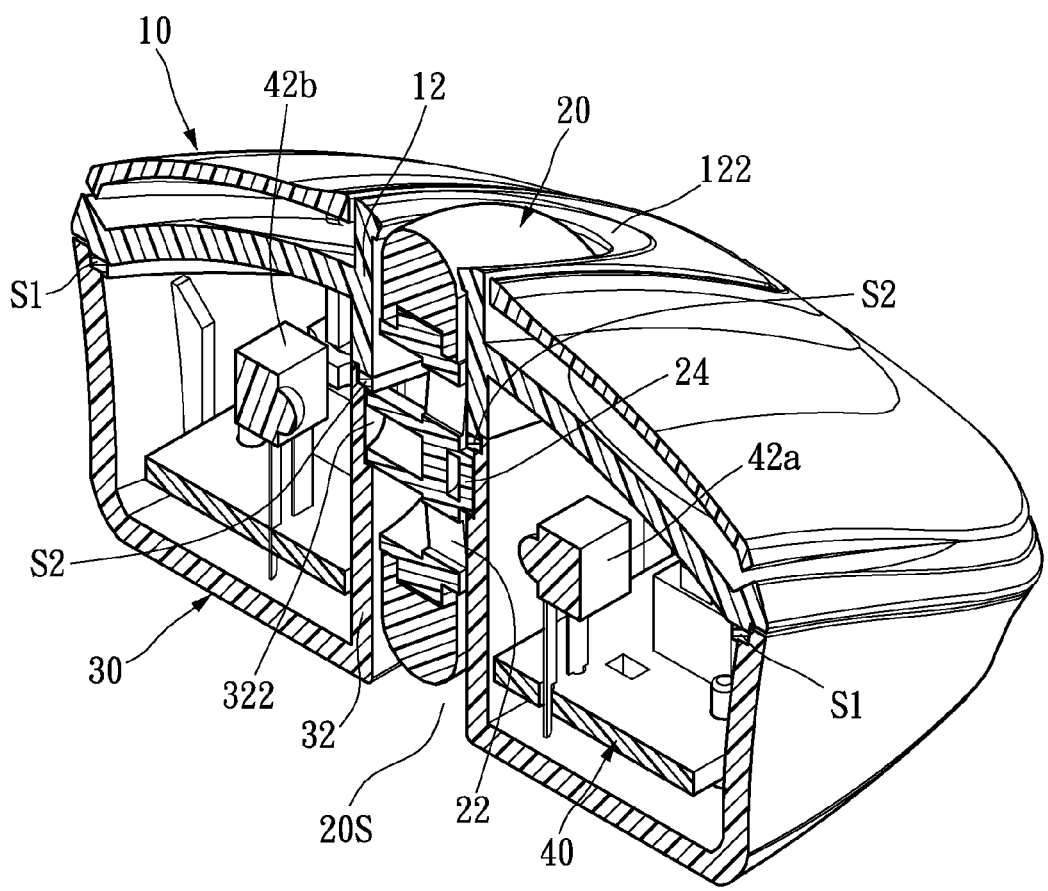
FIG. 3 is a perspective cross-sectional view of the waterproof computer mouse according to the instant disclosure.

Referring to FIG. 1 and FIG. 3, in which FIG. 3 is a perspective cross-sectional view of the instant disclosure. The roller 20 has a photo-grid portion 22 arranged in an annular manner. Two sides of the roller 20 have a pair of axial parts 24 outwardly extended respectively from a central part thereof. In this embodiment, the photo-grid portion 22 and the axial part 24 are formed integrally. The photo-grid portion 22 is arranged around the axial part 24 in a radial way. To receive the roller 20, the lower tubular portion 32 is formed with a pair of axial grooves 322 at two inner sides thereof. The axial parts 24 are disposed in the axial grooves 322 respectively. Besides, the upper tubular portion 12 has a blocking rim 122 formed at a top end thereof for exploding the roller 20 partially outside. However, the instant disclosure is not limited thereto, for example, the number of the axial part can be one; or the axial part is assembled in the photo-grid portion 22 instead of integral structure.

Figure 4:
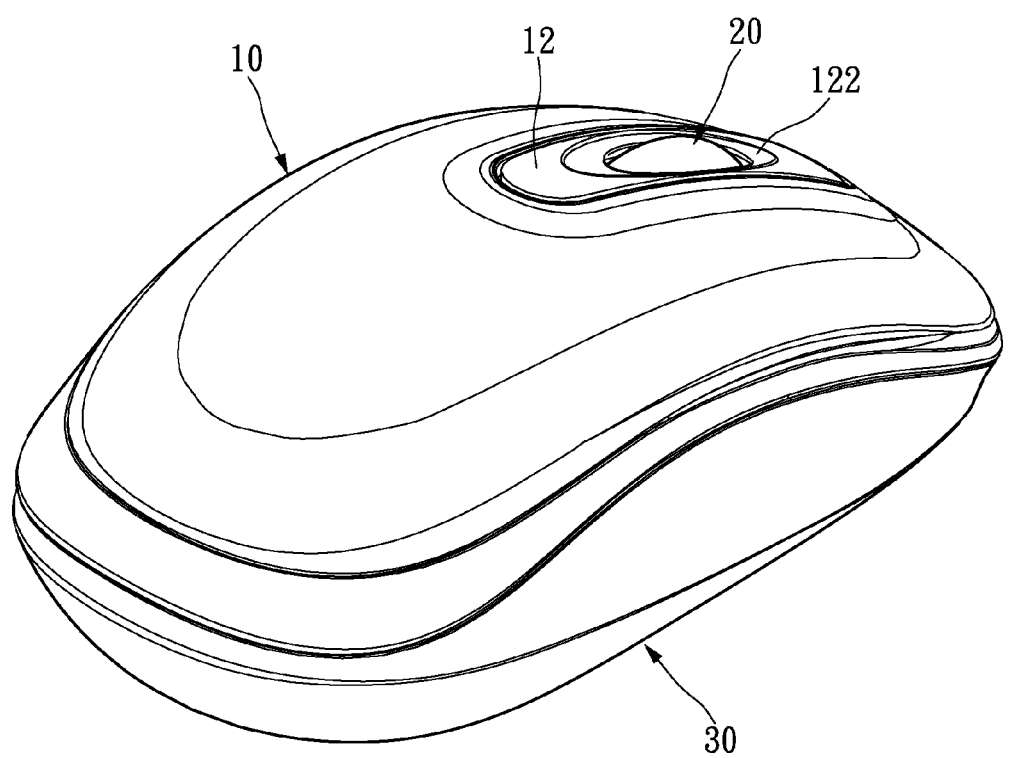
FIG. 4 is a perspective assembled view of the waterproof computer mouse according to the instant disclosure.

As shown in FIGS. 3 and 4, which illustrates the instant disclosure after assembled. The first waterproof ring S1 is disposed at an inner side of the top edge of the lower housing 30, and the bottom edge of the upper housing 10 downwardly pressed the first waterproof ring S1. Thus, the computer house has water-proofing function between the upper housing 10 and the lower housing 30. Moreover, concerning the waterproofing structure around the roller 20 is achieved by the second waterproof ring S2. On the one hand, the axial groove 322 provides a rotating space allowed the axial part 24 to rotate therein. On the other hand, the second waterproof ring S2 also provides a blocking function for the axial part 24. In other words, the top surface of the axial parts 24 is lower than the top edge of the lower tubular portion 32, that is lower than the second waterproof ring S2. Therefore, there is a well sealed waterproof structure between the upper tubular portion 12 and the lower tubular portion 32. Further, the roller compartment 20S formed between the upper tubular portion 12 and the lower tubular portion 32 is not communicated with the interior of the computer mouse. Even liquid is accidentally splashed to the roller 20, liquid would not flow into the interior of the computer mouse along the opening near the roller 20 to destroy elements on the circuit board 40. Liquid will be exhausted from the space between the upper tubular portion 12 and the lower tubular portion 32.

Referring to FIG. 3, the circuit board 40 has an emitter 42a and a receiver 42b oppositely disposed at outer sides of the lower tubular portion 32 corresponding to the photo-grid portion 22 of the roller 20. In this embodiment, the photo-grid portion 22 is closed to the emitter 42a. One characteristic of the instant disclosure is to provide the lower tubular portion 32 made of transparent material. Thus, a light beam from the emitter 42a can pass through a side wall of the lower tubular portion 32 and the photo-grid portion 22 of the roller 20, and pass another side wall of the lower tubular portion 32. Then, the light beam is received by the receiver 42b, so that a rotating condition of the roller 20 could be detected.

By the above design, the instant disclosure provides waterproof function. Because of the first waterproof ring S1, liquid can not enter the computer mouse from anywhere between the upper housing 10 and the lower housing 30. Further, because of the second waterproof ring S2, liquid can not either enter the computer mouse from anywhere between the upper tubular portion 12 and the lower tubular portion 32. Even liquid is accidentally splashed to the roller 20, it can be exhausted outside from the space between the upper tubular portion 12 and the lower tubular portion 32.

Figure 5:
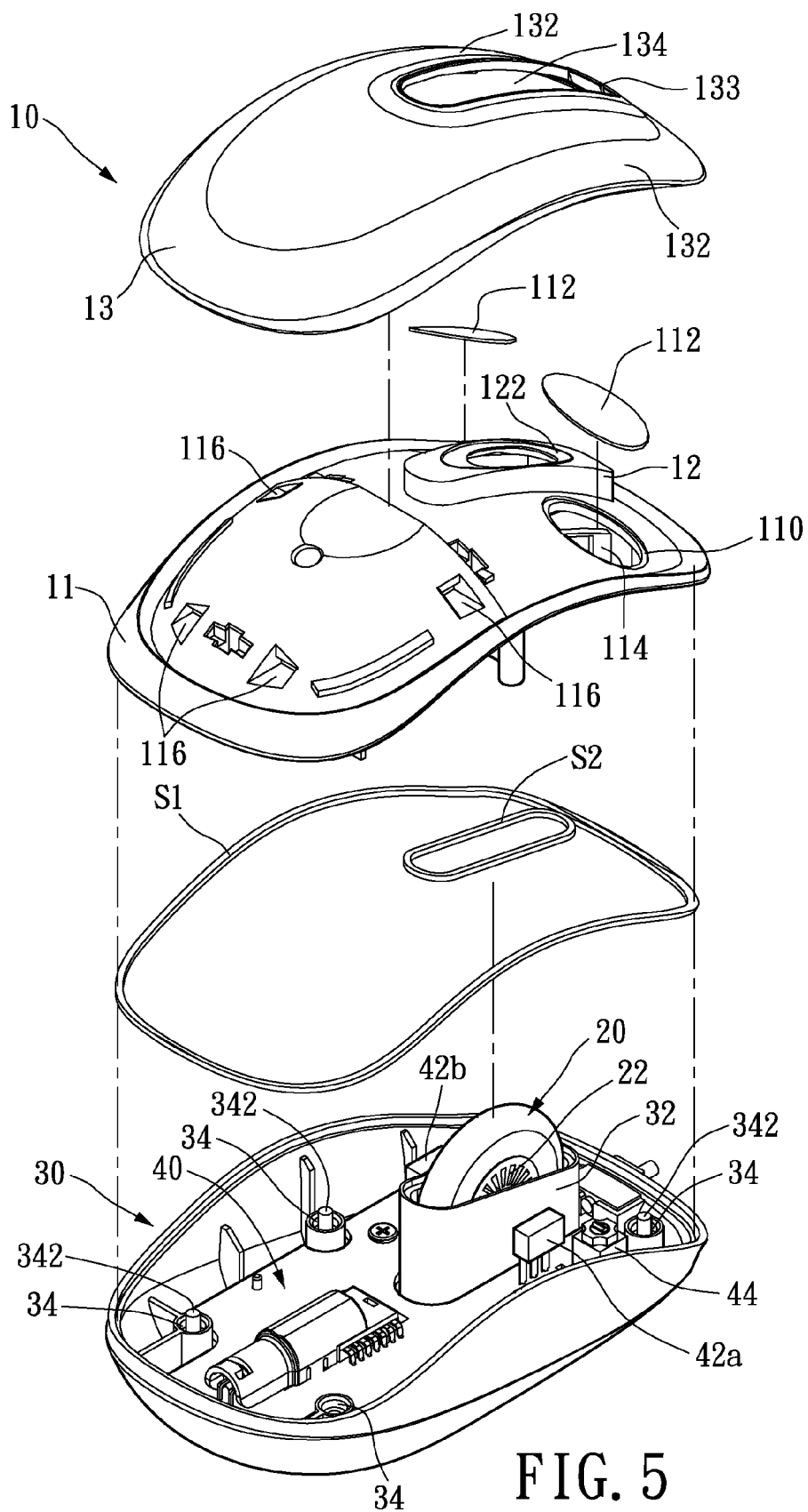
FIG. 5 is a perspective exploded view of the waterproof computer mouse according to the instant disclosure.
Figure 6:
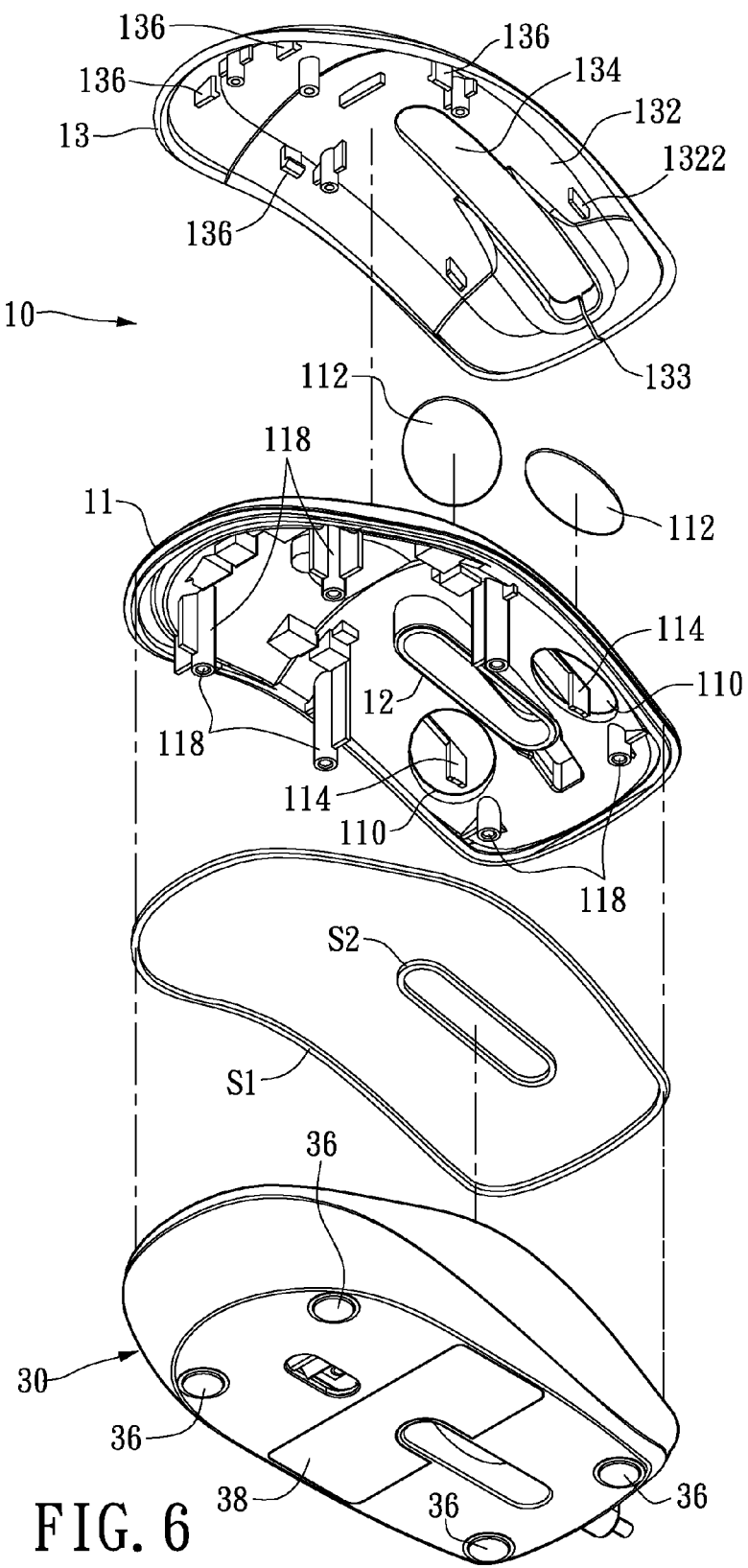
FIG. 6 is a perspective exploded view of the waterproof computer mouse according to the instant disclosure.

Referring to FIGS. 5 and 6, in this embodiment the upper housing 10 has a top member 11 and a pushing member 13 assembled on the top surface of the top member 11. The pushing member 13 has a pair of pushing buttons 132 located at a front end thereof and an opening 134 is formed between the pair of the pushing button 132. Each pushing button 132 extends downwardly a pressing tab 1322 from a bottom thereof. A slit 133 is formed at a front end of the pushing member 13, which is located between the pair of pushing buttons 132 for providing elasticity during press. The upper tubular portion 12 is extended upwardly and downwardly from the top member 11. The upper tubular portion 12 extends upwardly and is exposed outside the opening 134.

The top member 11 has a pair of through holes 110 and a pair of covering pads 112 covered the pair of through holes 110. The pair of covering pads 112 corresponds to the pair of pushing buttons 132, the circuit board 40 has a pair of micro switches 44 correspondingly disposed under the pair of covering pads 112. The pressing tabs 1322 of the pair of pushing buttons 132 correspondingly contact with top surface of the pair of covering pads 112. Various connecting means could be applied to the pair of covering pads 112 for covering the pair of through holes 110. In this embodiment, the top member 11 further has a pair of elastic arms 114 downwardly extended from an inner edge surrounded the through hole 110, and contacted to the pair of micro switch 44 on the circuit board 40.

Figure 7:
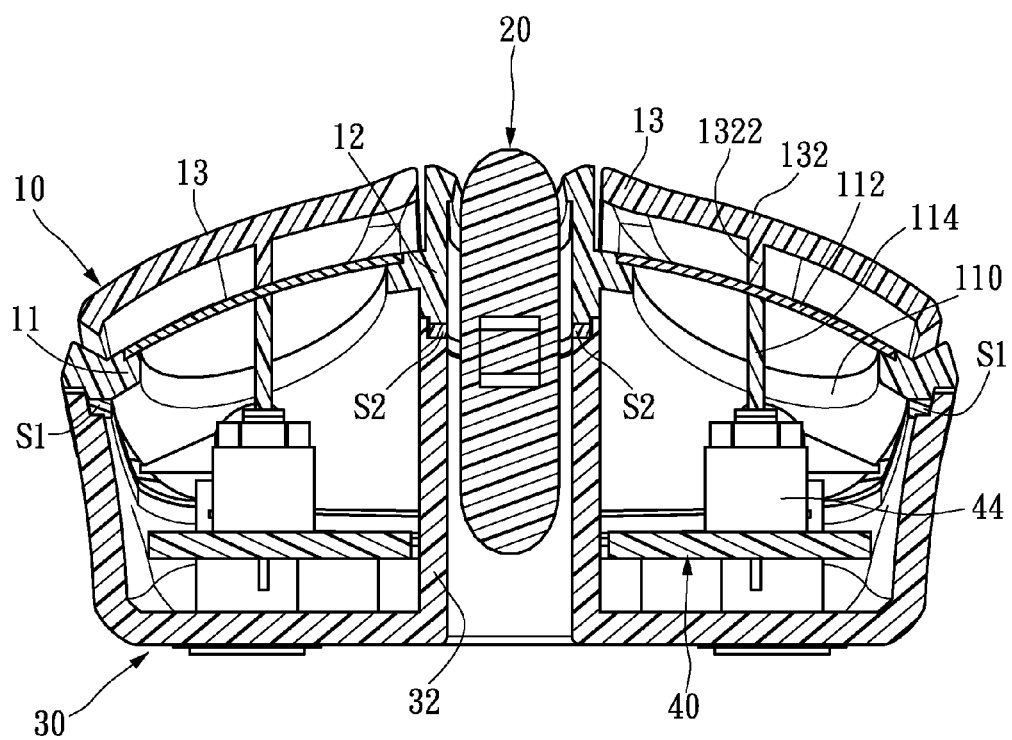
FIG. 7 is a cross-sectional view of the waterproof computer mouse according to the instant disclosure.

Referring to FIG. 7, when the pushing button 132 of the pushing member 13 is pressed downwardly, the pressing tab 1322 downwardly moves to touch the covering pad 112 of the top member 11. At the same time, the elastic arm 114 of the top member 11 is downwardly pushed to contact the micro switch 44 of the circuit board 40. In this embodiment, there is no any gap between the pushing button 132 and the micro switch 44 of the circuit board 40, thus liquid can not enter into the computer mouse. Even liquid accidentally splashed into the space between the pushing member 13 and the top member 11, liquid is blocked outside the top member 11 by the covering pad 112 and flows out along a top surface of the top member 11. Further, the first waterproof ring S1 between the top member 11 and the lower housing 30 also can prevent liquid entering into the computer mouse from the sides of the top member 11.

Referring to FIG. 6, which illustrates the assembly of the pushing member 13 and the top member 11. The pushing member 13 has a plurality of hook 136 downwardly extended from a bottom surface thereof. As shown in FIG. 5, corresponding to the hooks 136, the top member 11 has a plurality of engaging slot 116 formed on a top surface thereof, which are not through the top member and are like blind holes. The pushing member 13 therefore can engage with the top member 11.

Referring to FIG. 6. The top member 11 has a plurality of fixing posts 118 extended from a bottom surface thereof. The lower housing 30 has a plurality of screwing parts 34 which can be fixed to the fixing posts 118 by screws 342 correspondingly, and a plurality of sliding pads 36 and 38 covering on the screwing parts 34. The sliding pads 36 and 38 are disposed on the bottom surface of the lower housing 30, as shown in FIG. 5.

The instant disclosure can be applied to computer mice having wire or wireless computer mouse. The above-mentioned is only one embodiment of the waterproof computer mouse according to the present invention, and is not limited thereto. For example, the upper housing 30 can only include the top member 11, and the pushing member 13 can be omitted. The top surface of the top member 11 could be smooth, the upper tubular portion 12 only extends beneath the top member 11. The covering pad 112 even can directly contact the micro switch 44 of the circuit board 40, which are not necessarily through the elastic arms 114 to touch the micro switches 44. In other words, by pressing the covering pad 112 on the through hole 110, the micro switches 44 can be pushed.

In conclusion, the instant disclosure has at least advantages as follows.

1. According to the instant disclosure, a waterproof computer mouse includes the upper housing 10 having the upper tubular portion 12 downwardly extended in thorough manner, and the lower housing 30 having the lower tubular portion 32 upwardly extended through its bottom surface. The upper tubular portion 12 and the lower tubular portion 32 contribute a roller compartment therein and form a sealed structure by the second waterproof ring S2 disposed therebetween, so as to constitute a well waterproof opening structure around the roller 20. Even liquid is accidentally splashed on the computer mouse, liquid can be exhausted from the space through the upper tubular portion 12 and the lower tubular portion 32 to prevent liquid from entering into the computer mouse. Besides, an encoding function is achieved by the transparent lower tubular portion 32 operated with the photo-grid portion 22 of the roller 20.

2. Through the covering pad 112 of the instant disclosure, there is no any gap between the pushing button 132 and the micro switches 44 of the circuit board 40, so that liquid can not enter into computer mouse. Even liquid is accidentally splashed on the pushing member 13 and the top member 11, liquid is still is blocked outside the top member 11. By the first waterproof ring S1 disposed between the top member 11 and the lower housing 30, the instant disclosure can prevent liquid entering into the computer house from the sides of the top member 11.

The above-mentioned descriptions represent merely the preferred embodiment of the present invention, without any intention to limit the scope of the present invention thereto. Various equivalent changes, alternations or modifications based on the claims of present invention are all consequently viewed as being embraced by the scope of the present invention.

What is claimed is:

1. A waterproof computer mouse, comprising:
    an upper housing having an upper tubular portion downwardly extending from an interior facing side thereof in a through manner;
    wherein the upper housing has a top member and a pushing member assembled on the top member, the top member has a pair of through holes and a pair of covering pads correspondingly sealing the through holes;
    wherein the pushing member has a pair of pushing buttons formed at a front end thereof, and a pair of pressing tabs are formed on inner surfaces of the pushing buttons and positioned directly above the pair of covering pads, respectively;
    wherein the top member has a pair of elastic arms formed directly underneath the pair of covering pads corresponding to the pushing buttons, respectively;
    a lower housing having a lower tubular portion upwardly extending from an interior facing side thereof through a bottom surface thereof, the upper tubular portion being configured to mate with the lower tubular portion to form a roller compartment;
    a first waterproof ring disposed between a bottom edge of the upper housing and a top edge of the lower housing;
    a second waterproof ring disposed between a bottom edge of the upper tubular portion and a top edge of the lower tubular portion;
    a roller disposed in a rotatable manner in the roller compartment formed by the upper tubular portion and the lower tubular portion; and
    a circuit board disposed on the lower housing, the circuit board has a pair of micro switches located underneath the covering pads correspondingly;
    wherein when the pushing buttons are pressed, the pressing tabs are pushed against the covering pads, and thus the elastic arms are pushed by the covering pads toward the micro switches for pushing the micro switches on the circuit board correspondingly.

2. The waterproof computer mouse of claim 1, wherein the circuit board has an emitter and a receiver oppositely disposed at two outer sides of the lower tubular portion.

3. The waterproof computer mouse of claim 2, wherein the lower tubular portion is transparent to a signal emitted from the emitter, wherein the roller has a photo-grid portion arranged in an annular manner and configured to enable detection of roller motion from the emitter and the receiver.

4. The waterproof computer mouse of claim 1, wherein the roller has an axial part outwardly extended from one side thereof, the lower tubular portion is formed with an axial groove on an inner side surfaces thereof, wherein the axial part is received in the axial groove, wherein the axial part has a top surface is lower than a top edge of the lower tubular portion.

5. The waterproof computer mouse of claim 1, wherein the upper housing has a blocking rim at a top end of the upper tubular portion for partially exposing the roller.

6. The waterproof computer mouse of claim 1, wherein each elastic arm of the top member is extended downwardly from an inner edge of defining the through hole respectively.

7. The waterproof computer mouse of claim 1, wherein the pushing member has an opening formed between the pushing buttons, the pair of pushing buttons are corresponding to the pair of covering pads, the upper tubular portion is upwardly extended from the top member and exposed outside the opening.

8. The waterproof computer mouse of claim 7, wherein the pushing member has a plurality of hooks extended downwardly from a bottom surface thereof, the top member is formed with a plurality of engaging slots on a top surface thereof corresponding to the hooks.

9. The waterproof computer mouse of claim 1, wherein the top member has a plurality of fixing posts extended from a bottom surface thereof, the lower housing has a plurality of screwing parts corresponding to the fixing posts for fixing to the fixing posts by screws.

10. The waterproof computer mouse of claim 9, wherein the lower housing has a plurality of sliding pads disposed on a bottom surface thereof to cover the screwing parts.

* * * * *